United States Patent [19]

Yasuhara et al.

[11] Patent Number: 4,937,597

[45] Date of Patent: Jun. 26, 1990

[54] INK JET PRINTING HEAD

[75] Inventors: Takeshi Yasuhara; Kozo Matsumoto, both of Kanagawa, Japan

[73] Assignee: Fuji Electric Co., Ltd., Kanagawa, Japan

[21] Appl. No.: 290,537

[22] Filed: Dec. 27, 1988

[30] Foreign Application Priority Data

Feb. 16, 1988 [JP] Japan .................................. 63-33470

[51] Int. Cl.[5] .............................................. G01D 15/18
[52] U.S. Cl. ................................................. 346/140 R
[58] Field of Search .................................. 346/140 PD

[56] References Cited

U.S. PATENT DOCUMENTS 4,599,628 7/1986 Doring et al. ............... 346/140 PD
4,742,365 5/1988 Bartky et al. ................ 346/140 PD

*Primary Examiner*—George H. Miller, Jr.
*Attorney, Agent, or Firm*—Finnegan, Henderson, Farabow, Garrett, and Dunner

[57] ABSTRACT

An ink jet printing head comprises a cavity plate, a nozzle plate and a vibration plate. The cavity plate is formed with ink pressurizing chambers and the nozzle plate is formed with ink nozzles that are perpendicular to the ink pressurizing chambers. Piezoelectric elements are fixedly attached to external portions of the vibration plate corresponding to the ink pressurizing chambers for deforming the oscillatory plate upon the application of voltage. An ink distribution plate may be interposed between the cavity plate and the nozzle plate. The plates are superposed on each other to form an integral body which constitutes the printing head. The printing head is used in a known printing apparatus. With this arrangement, high printing quality can be achieved at a high printing head carriage speed.

7 Claims, 2 Drawing Sheets

INK JET PRINTING HEAD

BACKGROUND OF THE INVENTION

1. Field of the Invention

The present invention relates to an on-demand type ink jet printing head with a plurality of ink nozzles formed in a planar configuration.

2. Description of the Related Art

A conventional on-demand ink jet printing head executes printing by jetting ink from hyper-fine nozzle holes onto a recording medium such as paper. A conventional on-demand ink jet printing head is illustrated in FIG. 3. An on-demand printing head typically comprises a cavity plate 1 formed on stainless steel or glass. Cavity plate 1 is formed with ink nozzle holes 2, ink passageways 3, ink pressurizing chambers 4 and an ink supplying path 5 by etching or other manufacturing techniques. A cover plate 6, e.g., an oscillatory plate, is superimposed on cavity plate 1. An ink flow path is formed by bonding or fusing the cavity plate and the cover plate together. Piezoelectric elements 7, each functioning as an electromechanical transducer element, are bonded to the external portions of the cover plate which correspond to ink pressurizing chamber 4. An ink supplying hole 8 is perforated in a portion of the cover plate. Electrodes (not illustrated) are provided on the upper and lower surfaces of piezoelectric elements 7. Upon application of voltage to the electrodes, distortion occurs in each individual piezoelectric element 7, thereby deforming the cover plate. As a result, the capacity of each ink pressurizing chamber 4 is reduced, and ink is jetted from ink nozzle holes 2. Printing is thus performed.

An on-demand type ink jet printing head such as that shown in FIG. 3 is simple in structure, is therefore small in size and inexpensive to manufacture. In addition, the ink jet printing head of the type shown in FIG. 3 is relatively silent. In the above-described printing head, however, it is difficult to dispose a plurality of ink nozzles in a planar configuration because of the contraints of head construction and nozzle manufacturing techniques.

FIG. 4 is a perspective view schematically illustrating one example of a printing apparatus comprising an on-demand type ink jet printing head. Such an arrangement utilizes a number of nozzles typically twelve, and up to a maximum of twenty four. A recording medium paper 9 is guided in the direction indicated by an arrow A. A platen 10 is positioned behind paper 9 for guiding the paper. Platen 10 also serves as a carrier roller that is rotationally driven by a driving source (not shown) with the aid of a shaft 11. A guide shaft 12 and a guide rail 13 are disposed in parallel in front of the platen 10. A carriage 14 is supported and guided on the guide rail 13. Carriage 14 reciprocates in the directions indicated by arrows B. Carriage 14 is loaded with the ink jet printing head depicted in FIG. 3. Ink is jetted onto recording medium 9 while driving the printing head in synchronization with the movement of carriage 14 to execute printing.

In the above-mentioned system, the rate at which the carriage moves must increase remarkably to speed up the printing process. If the carriage is accelerated, however, the points at which the ink hits the paper deviate, due to the slowness of the lateral movement of the paper. Alternatively, no ink may jet out because air is sucked into the printing head at an increasing rate with increasing carriage speed. Hence, any attempt to speed up printing encounters limitations. Typically a printing head is equipped with 12 or 24 nozzles, and hence its resolution is 8-dot/mm at a maximum. Consequently, high quality printing cannot be achieved.

It is an object of the present invention to provide an on-demand type ink jet printing head capable of performing high quality printing at a high printing device carriage speed.

SUMMARY OF THE INVENTION

To achieve the foregoing objects, and in accordance with the purposes of the invention as embodied and broadly described herein, there is provided an on-demand type ink jet printing head comprising a cavity plate having a plurality of ink pressurizing chambers, a nozzle plate disposed on one side of the cavity plate and formed with a plurality of ink nozzles perpendicular to the ink pressurizing chambers, a vibration plate disposed on the other side of the cavity plate, and a plurality of electromechanical transducer elements attached to external portions of the vibration plate corresponding to the ink pressurizing chambers for deforming the vibration plate upon application of voltage.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

Figure 1:
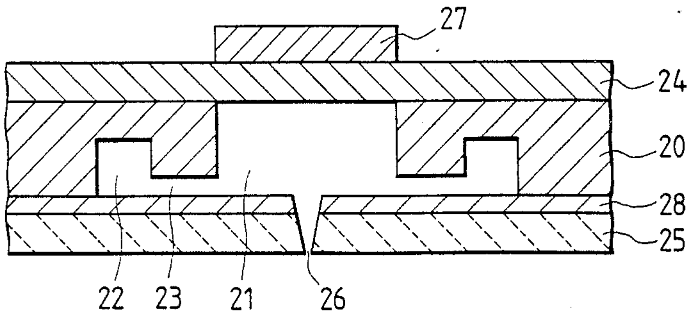
FIG. 1 is a sectional view illustrating the principal portion of an ink jet printing head according to a first embodiment of the present invention.

Referring to FIG. 1, there is illustrated an ink jet printing head according to a first embodiment of the present invention, wherein a single ink nozzle is depicted. A printing head shown in FIG. 1 includes a cavity plate 20 formed of metal or glass. Cavity plate 20 is formed with an ink pressurizing chamber 21, an ink passageway 22 and an ink supplying path 23 by etching or other manufacturing techniques. A vibration plate 24 and a nozzle plate 25 are secured to upper and lower surfaces of the cavity plate 20 by bonding or fusion. An ink distribution plate 28 may be optionally interposed between the cavity plate 20 and the nozzle plate 25. Nozzle plate 25 is perforated with a plurality of ink nozzles 26, each having a hole with a diameter of 50 to 100 μm. Piezoelectric elements 27, each functioning as an electromechanical transducer element, are attached by bonding to external portions of the oscillatory plate 24 to correspond to ink pressurizing chambers 21. Upon application of DC voltage the piezoelectric elements 27 expand in width but contract in length, thereby deforming the oscillatory plate. As a result, the volume of the capacity of each ink pressurizing chamber 21 reduces. Ink, formed in minute droplets, is jetted out of the ink nozzles 26. Printing is executed in this manner on a printing medium (not shown).

Figure 3:
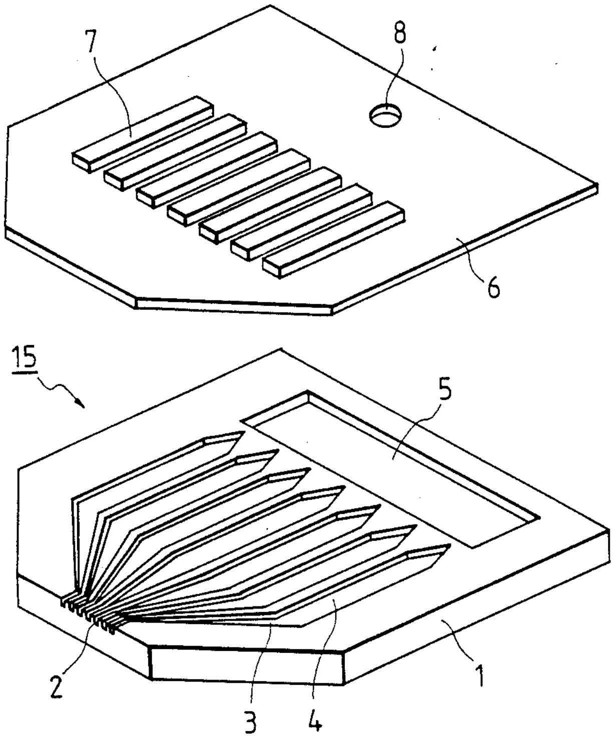
FIG. 3 PRIOR ART
FIG. 3 is an exploded perspective view illustrating one example of a prior art on-demand type ink jet printing head
Figure 4:
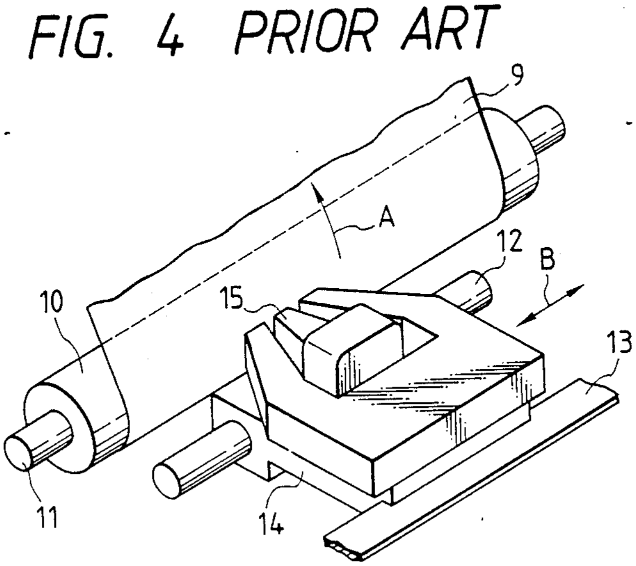
FIG. 4 PRIOR ART
FIG. 4 is a schematic diagram of a printing apparatus comprising the conventional printing head depicted in FIG. 3.

The ink jet printing head depicted in FIG. 1 is different from the conventional ink jet printing head of FIG. 3 in that the ink jets out in a direction perpendicular to the ink pressurizing chambers 21, whereas in FIG. 3 ink jets out in a direction parallel to ink pressurizing chambers 4. The printing head according to the present invention of FIG. 1 is constructed by superposing cavity plate 20, vibration plate 24, nozzle plate 25, and the optional ink distribution plate 28, and subsequently fixedly attaching piezoelectric elements 27 thereon. This simplified arrangement makes it possible to increase both the size of the printing head and the number of ink nozzles on the printing head.

Figure 2:
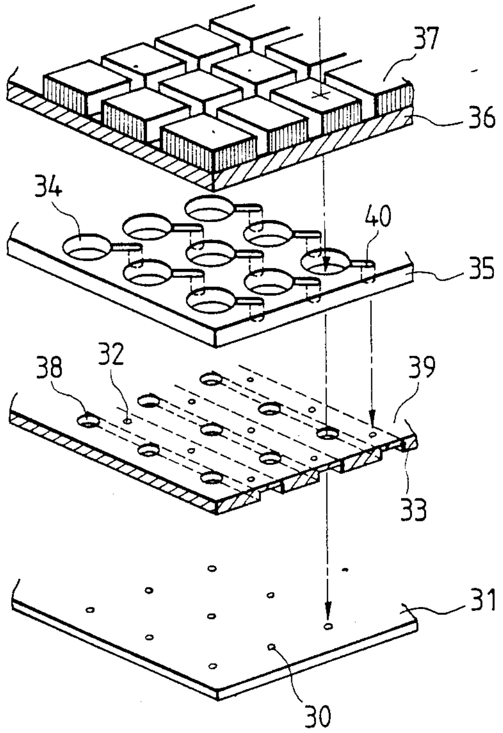
FIG. 2 is an exploded perspective view of an ink jet printing head according to a second embodiment of the present invention.

Turning now to FIG. 2, there is illustrated an exploded perspective view of an on-demand ink jet printing head according to a second embodiment of the present invention. In accordance with the embodiment of FIG. 2, a nozzle plate 31 is formed with a plurality of ink nozzles 30 arranged in a lattice configuration, with each nozzle 30 including a hole with a diameter of 50 μm. A cavity plate 35 has ink pressurizing chambers 34 formed therein. An ink distribution plate 33 is interposed between the cavity plate 35 and the nozzle plate 31. The distribution plate 33 includes ink supplying paths 32 ink passageways 38 and a plurality of holes 39 which communicate the ink supply paths with branched paths 40 leading from the ink pressurizing chambers 34 of the cavity plate 35. The ink passageways 38 communicate ink pressurizing chambers 34 with ink nozzles 30. Piezoelectric elements 37 are attached to external portions of vibration plate 36 corresponding to ink pressurizing chambers 34.

Nozzle plate 31, ink distribution plate 33, cavity plate 35, and an vibration plate 36 are superposed and bonded together to form one integral body, as a printing head. Upon application of voltage to piezoelectric elements 37, the ink jets out of ink nozzles 30 to execute printing on a recording medium (not shown).

The printing head according to the embodiment of FIG. 2 of the present invention is capable of providing a plurality of nozzles and therefore of simultaneously executing a plurality of printing processes. Even if the speed at which the carriage of the printing apparatus travels is relatively moderate, printing can be performed faster than with a conventional printing head.

In the example of FIG. 2, since the number of nozzles is increased compared to a conventional ink jet printing head, the spacing between the nozzles is decreased, resulting in an improved ink dot-density. However, when the spaces between the nozzles are decreased, ink pressurizing chambers 34 and piezoelectric elements 37 must be decreased in size correspondingly. This results in constraints in terms of processing and assembling the printing head. For this reason, where an improvement of dot-density is necessary, nozzle plate 31 may be formed with ink nozzles 30 disposed at predetermined spacings in a zigzag configuration, which alleviates some of the constraints in terms of processing and assembling the head.

As discussed above, the present invention provides advantages by virtue of its arrangement. The on-demand ink jet printing head of the present invention includes a plurality of ink pressurizing chambers. A plurality of ink nozzles perpendicular to the chambers may be formed in a lattice or a zigzag alignment. Electromechanical transducer elements corresponding to the ink pressurizing chambers are fixedly attached to external portions of the vibration plate. With the arrangement of the present invention, it is possible to increase the size of the printing. It is further possible to provide a plurality of nozzles, thereby improving the resolution of the printing head and speeding up the printing process, even when the lateral movement of the head is relatively slow.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

What is claimed is:

1. An ink jet printing head comprising:
   - a cavity plate having a plurality of ink pressurizing chambers;
   - a nozzle plate disposed on one side of said cavity plate and having a plurality of nozzles formed in a planar configuration extending in a direction substantially perpendicular to said ink pressurizing chambers;
   - an ink distribution plate interposed between said cavity plate and said nozzle plate;
   - a plurality of ink supply paths formed in said ink distribution plate, the ink supply paths providing communication between the ink pressurizing chambers and the ink nozzles;
   - a plurality of ink passageways formed in said ink distribution plate and intersecting the ink supply paths, the ink supply passageways further providing communication between the ink pressurizing chambers and the ink nozzles;
   - a vibration plate disposed on the other side of said cavity plate, and
   - a plurality of electromechanical transducer means attached to said vibration plate in correspondence with said ink pressurizing chambers for deforming said vibration plate, whereby upon application of voltage to the transducer means, the volume of said corresponding pressurizing chambers is changed to supply ink therein to the nozzles via the ink supply paths and the ink passageways, respectively.

2. An ink jet printing head as set forth in claim 1, wherein said ink nozzles are formed in a lattice configuration.

3. An ink jet printing head as set forth in claim 2, wherein said nozzle plate, said cavity plate, said vibration plate and said ink distribution plate are superposed to form an integral body.

4. An ink jet printing head as set forth in claim 1, wherein said cavity plate includes a plurality of branched paths formed therein for providing communication between the ink pressurizing chambers and the ink supply paths.

5. An ink jet printing head as set forth in claim 4, wherein said distribution plate further includes a plurality of holes intersecting said ink supply paths and providing communication between the branched paths and the ink supply paths.

6. An ink jet printing head as set forth in claim 1, wherein said electromechanical transducer means further comprises piezoelectric elements.

7. An ink jet printing head as set forth in claim 1, wherein said nozzle plate, said cavity plate, said vibration plate and said ink distribution plate are superposed to form an integral body.

* * * * *